April 28, 1942.     E. M. CHAPMAN     2,281,267
EATING UTENSIL
Filed April 30, 1940
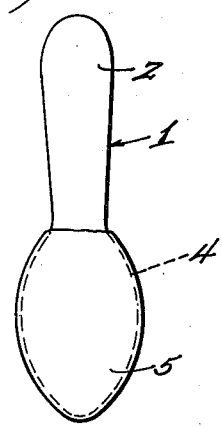
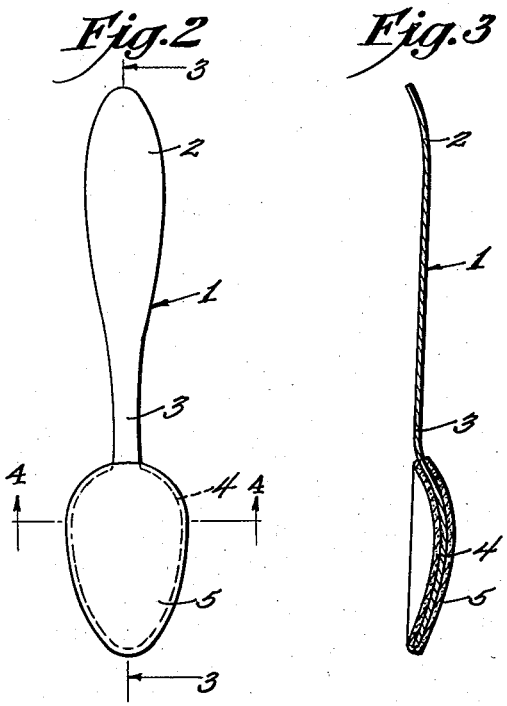
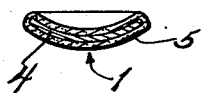
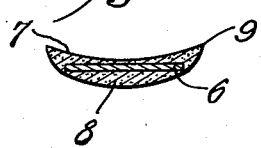
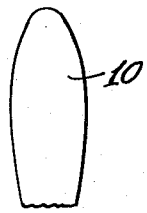
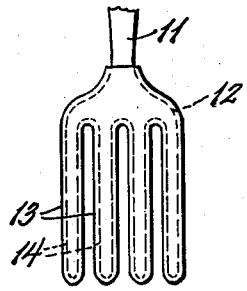
Inventor
Elton M. Chapman
By A. D. Adams
Attorney Patented Apr. 28, 1942

2,281,267

UNITED STATES PATENT OFFICE 2,281,267

EATING UTENSIL

Elton M. Chapman, Atlanta, Ga.

Application April 30, 1940, Serial No. 332,570

6 Claims. (Cl. 30—345)

The present invention relates to an eating utensil, such as a spoon, fork and the like, in which the portion thereof which comes in contact with the mouth of the user is provided with a soluble coating or layer.

It is an object of this invention to provide an eating utensil with a flavored coating as a confection or candy which is soluble when in contact with the mouth. It is a further object of the invention to provide the utensil with a complete permanent portion and a candy coated portion, the latter portion being preferably limited to such part or parts on the permanent portion which actually come in contact with the tongue or other parts of the mouth.

Further objects will be apparent from the following description, taken in connection with the accompanying drawing, in which:

Fig. 1 is a plan view of a coated wooden spoon;

Fig. 2 is a plan view of a modified spoon;

Fig. 3 is a sectional view of the spoon taken on line 3—3 of Fig. 2;

Fig. 4 is a cross section of the spoon taken on line 4—4 of Fig. 2;

Fig. 5 is a plan view of another utensil in the form of a fork; and

Fig. 6 is a cross section of a modified construction of a spoon.

The spoon 1 may be made of metal, wood, cardboard, pressed paper, fabricated material, or any other suitable material which is permanent and is composed of a handle 2, a shank 3, Figs. 2 to 4, and a bowl 4, all integrally connected. Fig. 1 illustrates a short flat spoon which has a handle 2 and a flat "bowl" portion 4 with a candy coating 5. The bowl portion 4 is coated with a preferably thin cover of a confection, or preferably candy, layer 5 of any suitable thickness and is made of sugar, corn syrup, gelatin or any other ingredients, preferably flavored with mint, orange, lime, chocolate, vanilla, etc., as may be desired. In this connection, it adds to the attractiveness of the utensil to color the sugar coating 5 with a vegetable dye to correspond with the particular flavor utilized, such as green for mint, yellow for lemon, etc.

It is of course possible to shape the bowl 4 flat or with only a slight concavo-convex configuration. Likewise, the coating itself may be shaped into a slight concave configuration on one side and a slight convex configuration on the other side with a permanent spoon having a perfectly flat permanent "bowl" portion as illustrated in Fig. 6. In this figure, the flat permanent "bowl" portion 6 has a candy coated layer 7 of concave form on one side and a candy coated layer 8 of convex form on the other side with a somewhat sharp peripheral edge 9 on the concave side. In this way, the edge 9 will aid in scooping or cutting the particular food or dessert which is to be consumed or at least it will function in that manner until the edge ultimately and progressively disappears into solution in the mouth.

Fig. 5 shows the invention as applied to a fork which has the usual handle 10, shank 11 and the prong or tine portion 12 of which the latter is provided with a coating 13, principally on the prongs or tines 14, similar to the coating material already referred to.

The eating utensils according to this invention can be made by any suitable methods, such as by dipping the bowl portion of the spoon or the prong portion of the fork into a warm or hot solution of the coating material which has been previously colored and flavored as desired and which, upon cooling on the bowl or prong portion, will form the desired layer. If the layer is too thin, redipping or a thicker solution will produce the desired thickness of the layer.

In using the coated utensil, for instance with ice cream or frozen malted milk, the user dips the coated bowl end of the spoon into the frozen food and a portion thereof is placed into the mouth which, upon removal by the tongue, the latter at the same time draws a part of the surface of the layer as a solution therefrom. This will add to the flavor of the food consumed and the effect thereof is not only novel, but is useful in flavoring the food, as may be desired, by choosing the particular flavored spoon.

The fork is particularly useful when eating cake, for instance, which is not iced and of which the coated layer on the prong portion will supply the desired sweetening and flavor desired.

This invention is not limited to the particular embodiments disclosed, since it is susceptible of changes within the scope of the appended claims.

What is claimed is:

1. An eating utensil comprising a permanent portion composed of a handle, a shank and a food holding portion; and a coating on the food holding portion in the form of a layer of edible flavored material.

2. An eating utensil comprising a permanent portion having a handle and a food holding portion; and a coating on the food holding portion in the form of a layer of edible flavored material.

3. An eating utensil comprising a permanent spoon having a handle, a shank and a bowl portion; and a candy layer entirely surrounding the bowl portion.

4. An eating utensil comprising a permanent fork having a handle, a shank and a prong portion; and a candy layer entirely surrounding the prong portion.

5. An eating utensil comprising a permanent spoon having a handle and a flat bowl portion; and a candy coating on both sides of the flat bowl portion of which a convex candy layer is on one side of the flat bowl portion and a concave candy layer on the other side with a peripheral edge on and integral with the concave side.

6. An eating utensil comprising a permanent spoon having a handle and a flat bowl portion; and a candy coating on both sides of the flat bowl portion to impart a concavo-convex configuration to the bowl portion.

ELTON M. CHAPMAN.